3,553,238
PURIFICATION OF CARBOXYLIC ACID ESTERS WITH ANHYDROUS AMMONIA

Moses Cenker, Trenton, Mich., assignor to Wyandotte Chemicals Corporation, Wyandotte, Mich., a corporation of Michigan
No Drawing. Filed May 27, 1968, Ser. No. 732,075
Int. Cl. C07c *67/06*
U.S. Cl. 260—410.6            6 Claims

ABSTRACT OF THE DISCLOSURE

A process for removing sulfur-containing impurities from organic esters by treating said esters with anhydrous ammonia at a temperature of at least about 140° C. to precipitate the impurities, followed by removal of the precipitated impurities.

---

In preparing organic esters, an alcohol and an acid are brought together in the presence of catalysts such as sulfuric acid, toluenesulfonic acid, and benzenesulfonic acid.

Generally, stoichiometric amounts of alcohols and organic acids are theoretically required. Quite often in order to consume substantially all of one of the reactants, an excess, perhaps about 10% or more by volume, of the other reactant is employed. The reactant employed in excess is usually the one which can be most easily removed from the reaction mixture. An additional method commonly used to increase the equilibrium yield of ester is to remove the water of esterification by means of sparging with an inert gas or azeotropically with or without an entraining agent. The esters recovered from the reaction mixture are not always satisfactory for commercial use, however, since they generally possess a high acidity.

The high acidity of the ester can occur for several reasons. In cases wherein there is incomplete reaction between the alcohol and the organic acid, and the organic acid is in excess, the ester produced will be contaminated with some of the organic acid. In addition, side reactions often occur producing acidic compounds which further contaminate the desired ester.

In accordance with prior art practice, it is known to treat the ester with an alkali, particularly an aqueous alkaline wash to neutralize the acidity. However, even when treated with an alkali, the esters recovered from the reaction mixture are not wholly satisfactory since the sulfur-containing acid catalysts also react with the alcohol to produce small amounts of sulfur-containing impurities which are difficult to remove from the organic ester products. The sulfur-containing impurities are undesirable in that they result in color or odor developments in the end product use of the organic esters. These sulfur-containing impurities, which presumably are esters, are difficult to remove by distillation due to the high boiling points of the products and the proximity of boiling points of the impurity and the desired product or by aqueous alkaline wash because of poor contact or their insolubility in water.

Accordingly, it is a purpose of the instant invention to remove sulfur-containing impurities from organic esters which have been prepared by reacting alcohol with organic acid in the presence of a sulfur-containing catalyst.

This and other purposes of the invention are achieved by treating such organic esters with anhydrous ammonia at a temperature of at least about 140° C. and preferably about 140° C. to 180° C. This precipitates these impurities which are removed by filtration after which excess ammonia is removed by stripping.

The conditions under which the esters which are to be treated in accordance with the process of the present invention are prepared are conventional and need not be described in great detail. Thus, the esterification is satisfactorily carried out by refluxing the organic acid with an alcohol in approximately stoichiometric amounts in the presence of a suitable sulfur-containing catalyst for a period of about one-half to about fifty hours. Although esterification can proceed to some degree at temperatures as low as room temperature, elevated temperatures on the order of about 60° C. to about 250° C. are preferably employed. When temperatures exceeding the boiling point of water are employed, and the alcohol used is not completely miscible with water, water of esterification can be trapped off, thus tending to drive the esterification reation to completion.

Examples of organic alcohols which can be employed include methyl alcohol, ethyl alcohol, propyl alcohol, isopropyl alcohol, butyl alcohol, isobutyl alcohol, secondary butyl alcohol, hexyl alcohol, octyl alcohol, isooctyl alcohols (such as prepared by the Oxo process), 2-ethylhexyl alcohol, decyl alcohol, tridecyl alcohol, octadecyl alcohol, benzyl alcohol, cyclohexyl alcohol, ethylene glycol, hexylene glycol, triethylene glycol, glycerol, pentaerythritol, dipentaerythritol, etc.

Examples of organic acids which can be employed include acetic, propionic, butyric, isobutyric, pentanoic, pivalic, hexanoic, octanoic, isooctanoic (including 2-ethylhexoic and mixtures of isooctanoic acids such as produced from the Oxo and other carbonylation processes), nonanoic, isononanoic, decanoic, lauric, tridecanoic, oleic, stearic, benzoic, toluic, phthalic, isophthalic, terephthalic, trimellitic, pyromellitic, oxalic, succinic, glutaric, adipic, azelaic, sebacic, acrylic, methacrylic, lactic, chloracetic, chlorobenzoic, etc. Sulfur-containing catalysts which may be employed include sulfuric acid, benzenesulfonic acid, toluenesulfonic acid, xylenesulfonic acid, ethanesulfonic acid, hexanesulfonic acid, α-camphor sulfonic acid.

The esters which are to be treated in accordance with the process of this invention contain more than 10 carbon atoms in the molecule, preferably from about 10 to 120 carbon atoms in the molecule. Examples of esters which can be treated by the process defined herein include hexyl octanoate, stearyl tridecanoate, dibutyl oxalate, dioctyl adipate, diisooctyl azelate, hexyl decyl sebacate, diethyl phthalate, diisooctyl phthalate, butyl benzyl phthalate, pentaerythritol tetraisooctanoate, tripentaerythritol tridecanoate, diallyl phthalate. etc.

The treatment of the impure esters with the ammonia can be effected in any manner provided there is effective and adequate contact therebetween. In general, the contact is created by bubbling a stream of anhydrous ammonia through the stirred ester which is slowly heated up to temperature.

Generally, no change in appearance occurs until the temperature exceeds 140° C. when a white crystalline solid appears. The ammonia treatment is then continued for a period of time of from about 0.25 to 2 hours at the temperature in excess of 140° C. and preferably from about 140° C. to 180° C. The pressure generally is not critical and any suitable pressure can be employed under the conditions of treatment. Thus, for convenience sake it is preferred to employ atmospheric pressure. The process of the instant invention can further be described by reference to the following examples.

EXAMPLE I 450 parts by weight of ethyl alcohol and 200 parts by weight of benzene are charged to a round-bottom flask fitted with a stirrer, thermometer, condenser, and water take-off apparatus along with 166 parts by weight of isophthalic acid and 20 parts by weight of paratoluenesulfonic acid. The reaction mixture is stirred and heated at reflux (initially 68° C. rising to about 100° C. as the reaction proceeds) for 56 hours, water of reaction being constantly removed as the bottom layer of a heteroazeotrope until the total of 35 grams of water has been removed. Excess ethyl alcohol and benzene are then distilled off. The product is then neutralized by adding a stoichiometric amount plus 10% of aqueous sodium carbonate with stirring. After three water washes the product is heated to 100° C. at 10 mm. pressure for 2 hours and sparged with nitrogen to remove the last traces of water.

200 parts by weight of the diethyl isophthalate prepared above are charged to a round-bottom flask fitted with a stirrer, thermometer, gas dispersion tube which is below the surface of the liquid, and an open-end condenser. A slow stream of anhydrous ammonia is bubbled into the stirred ester and slowly heated to 144° C. over a period of 50 minutes. No change in appearance occurs until the temperature reaches 144° C. when a white crystalline solid suddenly appears. The ammonia treatment is continued for 1 hours and 26 minutes at a temperature of 137° C. to 161° C. The mixture is then cooled, filtered, and vacuum stripped (140° C. to 157° C. at 8–10 mm. pressure for 48 minutes) to remove the ammonia. Analysis of the ester by X-ray fluorescence before and after ammonia treatment shows the sulfur content reduced from 0.16% to 0.02%.

EXAMPLE II 200 parts by weight of allyl alcohol are charged to a round-bottom flask fitted with a stirrer, thermometer, condenser, and water take-off apparatus along with 150 parts by weight of phthalic anhydride and 5 parts by weight of benzene-sulfonic acid. The flask is stirred and heated at 82° C to 87° C. for 24 hours and then slowly distilled to remove the azeotrope boiling at 88° C. to 89° C. Final traces of alcohol and water are removed by vacuum stripping at 100° C. at 10 mm. pressure for 1 hour. The contents of the flask are cooled to room temperature and the product is then neutralized by adding a stoichiometric amount plus 10% of aqueous sodium carbonate with stirring. After three water washes the product is heated to 110° C. for 2 hours and sparged with nitrogen to remove the last traces of water.

200 parts by weight of the diallyl phthalate prepared above are charged to a round-bottom flask fitted with a stirrer, thermometer, gas dispersion tube which is below the surface of the liquid, and an open-end condenser. A slow stream of anhydrous ammonia is bubbled into the stirred ester and heated to 144° C. over a period of 15 minutes. No change in appearance occurs until the temperature reaches 144° C. when a white crystalline solid suddenly appears. The ammonia treatment is continued for 30 minutes at a temperature 145° C. to 150° C. The mixture is then cooled, filtered, and vacuum stripped (70° C. to 75° C. at 20–25 mm. pressure for 1 hour) to remove the last traces of ammonia. The sulfur content of the ester is reduced from 0.19% to 0.008%.

EXAMPLE III 300 parts by weight of octyl alcohol are charged to a round-bottom flask fitted with a stirrer, thermometer, condenser, and water take-off apparatus along with 150 parts by weight of adipic acid and 2 parts by weight of sulfuric acid. The flask is sparged with carbon dioxide and stirred while bringing the flask contents to the esterification temperature of about 135° C. The temperature of about 130° C. to 140° C. is maintained while stirring and sparging with carbon dioxide for 8 hours, water of reaction being constantly removed until the total of 36 grams of water has been collected. Gas sparging is continued until the contents of the flask are cooled to room temperature. The product is then neutralized by adding a stoichiometric amount plus 10% of the aqueous sodium carbonate with stirring. After three water washes the product is heated to 135° C. for 2 hours and sparged with nitrogen to remove the last traces of water.

200 parts by weight of the dioctyl adipate prepared above and one part anhydrous ammonia charged as a liquid are charged to a pressure vessel fitted with a stirrer, thermometer, gas dispersion tube which is below the surface of the liquid, and an open-end condenser. The mixture is stirred and heated to 150° C. venting as necessary to maintain the pressure at or below 100 p.s.i.g. The mixture is stirred for 30 minutes at a temperature of 145° C. to 150° C. and then cooled to 50° C. The product is slowly vented to atmospheric pressure, filtered, and stripped (70° C. to 75° C. at 20–25 mm. pressure for 1 hour) to remove the last traces of ammonia. The sulfur content of the ester is reduced from 0.13% to 0.002%.

EXAMPLE IV 200 parts by weight of hexyl alcohol are charged to a round-bottom flask fitted with a stirrer, thermometer, condenser, and water take-off apparatus along with 144 parts by weight of octanoic acid and 3 parts by weight of xylenesulfonic acid. The flask is stirred and heated at 98° C. to 120° C. for 6 hours, water of reaction being constantly removed as the azeotrope with hexyl alcohol until the total of 45 grams of azeotrope (equivalent to 34 g. of water) has been collected. Excess alcohol is then removed by distillation under vacuum. The product is then cooled to room temperature and neutralized by adding a stoichiometric amount plus 10% of aqueous sodium carbonate with stirring. After three water washes the product is heated to 110° C. for 2 hours and sparged with nitrogen to remove the last traces of water.

100 parts by weight of the hexyl octanoate prepared above are charged to a round-bottom flask fitted with a stirrer, thermometer, gas dispersion tube which is below the surface of the liquid, and an open-end condenser. A slow stream of anhydrous ammonia is bubbled into the stirred ester and slowly heated to 144° C. over a period of 50 minutes. No change in appearance occurs until the temperature reaches 144° C. when a white crystalline solid suddenly appears. The ammonia treatment is continued for 1 hour and 26 minutes at a temperature of 137° C. to 161° C. The mixture is then cooled, filtered, and vacuum stripped (140° C. to 150° C. at 8–10 mm. pressure for 1 hour) to remove the last traces of ammonia. The sulfur content is reduced from 0.16% to 0.02%.

EXAMPLE V 200 parts by weight of butyl alcohol, 100 parts by weight of oxalic acid, and 4 parts by weight of toluenesulfonic acid are reacted according to the procedure in Example II.

200 parts by weight of the dibutyl oxalate prepared above are charged to a round-bottom flask fitted with a stirrer, thermometer, gas dispersion tube which is below the surface of the liquid, and an open-end condenser. A slow stream of anhydrous ammonia is bubbled into the stirred ester and slowly heated to 144° C. over a period of 50 minutes. No change in appearance occurs until the temperature reaches 144° C. when a white crystalline solid suddenly appears. The ammonia treatment is continued for 1 hour and 26 minutes at a temperature of 140° C. to 150° C. The mixture is then cooled, filtered, and vacuum stripped (140° C to 150° C at 8–10 mm. pressure for 1 hour) to remove the last traces of ammonia. The sulfur content is reduced from 0.16% to 0.02%.

It is to be understood that various changes and modifications may be made in the foregoing process without departing from the spirit of the invention and scope of the appended claims.

What is claimed is:

1. A process for removing sulfur-containing impurities from organic carboxylic acid esters which comprises treating said esters with anhydrous ammonia at a temperature of at least about 140° C. to precipitate said impurities and removing said precipitated impurities.

2. The process of claim 1 wherein said treatment is performed at a temperature of about 140° C. to 180° C.

3. The process of claim 1 wherein excess ammonia is removed from said product subsequent to removal of said precipitate.

4. The process of claim 3 wherein said treatment is performed at a temperature of 140° C. to 180° C.

5. The process of claim 3 wherein said precipitate is removed by filtration and said excess ammonia is removed by stripping.

6. The process of claim 5 wherein said treatment temperature is from about 140° C to 180° C.

References Cited

UNITED STATES PATENTS

| 3,046,303 | 7/1962 | Cruickshank | 260—486 |
| 3,324,156 | 6/1967 | Elder et al. | 260—410.6 |

LEWIS GOTTS, Primary Examiner

D. G. RIVERS, Assistant Examiner

U.S. Cl. X.R.

260—410.7, 410.9, 475, 476, 484, 485, 486, 487, 499